(12) United States Patent
Lekar (10) Patent No.: US 8,167,021 B2
(45) Date of Patent: May 1, 2012

(54) LEVER ROLL-UP SHADE WITH STOP DAMPER

(75) Inventor: Jan Lekar, Reichenbach (DE)

(73) Assignee: BOS GmbH & Co. KG, Ostfildern (DE)

( * ) Notice: Subject to any disclaimer, the term of this patent is extended or adjusted under 35 U.S.C. 154(b) by 282 days.

(21) Appl. No.: 12/167,587

(22) Filed: Jul. 3, 2008

(65) Prior Publication Data
US 2009/0014136 A1 Jan. 15, 2009

(30) Foreign Application Priority Data
Jul. 10, 2007 (DE) .......................... 10 2007 032 435

(51) Int. Cl.
*B60J 3/00* (2006.01)
(52) U.S. Cl. .................................. 160/370.22; 296/97.8
(58) Field of Classification Search ............. 160/370.22, 160/265; 296/141, 143, 97.8, 97.4; 49/349, 49/351, 352, 372, 374; 248/636, 632, 633, 248/634, 317, 489; 16/82, 86 R; 188/371, 188/377; 267/152, 153
See application file for complete search history.

(56) References Cited

U.S. PATENT DOCUMENTS

| | | | |
|---|---|---|---|
| 4,836,263 A * | 6/1989 | Ament ............................. 160/68 |
| 4,946,727 A * | 8/1990 | Kessler ........................... 428/99 |
| D315,542 S * | 3/1991 | Dalton et al. ................ D12/217 |
| 5,149,569 A * | 9/1992 | McCue ........................... 428/31 |
| 5,752,560 A | 5/1998 | Cherng | |
| 6,640,497 B2 * | 11/2003 | Sakaguchi et al. .............. 49/352 |
| 6,675,862 B2 * | 1/2004 | Kobayashi et al. ...... 160/370.22 |
| 7,163,244 B2 * | 1/2007 | Meltzer ......................... 293/128 |
| 2003/0159357 A1 * | 8/2003 | Sakaguchi et al. .............. 49/352 |

FOREIGN PATENT DOCUMENTS

| | | |
|---|---|---|
| DE | 553589 A | 6/1932 |
| DE | 2015916 A | 10/1971 |
| DE | 8031383.3 U1 | 3/1981 |
| DE | 19806736 A1 | 8/1999 |
| EP | 240747 B1 | 4/1990 |
| GB | 580217 A | 6/1945 |
| GB | 2278141 A | 11/1994 |
| WO | PCT/KR85/00013 A1 | 1/1986 |
| WO | WO 02/38404 A1 | 5/2002 |

* cited by examiner

*Primary Examiner* — Blair M Johnson
*Assistant Examiner* — Jaime F Cardenas-Garcia
(74) *Attorney, Agent, or Firm* — Leydig, Voit & Mayer, Ltd.

(57) ABSTRACT

A lever actuated roll-up shade assembly for motor vehicle windows having a stop brake for slowing down movement of actuating levers of the roll-up shade assembly during movement into a position corresponding to the retracted position of the roller shade so as to prevent loud impact noises.

20 Claims, 5 Drawing Sheets

LEVER ROLL-UP SHADE WITH STOP DAMPER

CROSS-REFERENCE TO RELATED APPLICATIONS

This patent application claims the benefit of German Patent Application No. 102007032435.0-56, filed Jul. 10, 2007, which is incorporated by reference.

FIELD OF THE INVENTION

The present invention relates generally to roll-up shade assemblies, and more particularly, to roll-up shade assemblies for the rear windows of motor vehicles.

BACKGROUND OF THE INVENTION

EP 0 240 747 A1 describes a lever actuated roll-up shade for motor vehicles. The roll-up shade is to be used for reducing solar radiation through the rear window in order to prevent the interior from heating up quickly. In addition, the extended roll-up shade reduces the demands on the air-conditioner when there is strong solar radiation.

The known roll-up shade has a wind-up shaft mounted so that it can rotate in a roll-up shade housing. Two two-armed levers spaced apart along the wind-up shaft are hinged to the housing. The rotational axis of the levers lies perpendicular to the longitudinal axis of the wind-up shaft. Sliding blocks, which slide in a guide groove of the pull rod, are disposed on the free end of the longer of the two arms. The roll-up shade web has one edge attached to the pull rod, with the other edge of the roll-up shade web being anchored to the wind-up shaft.

For moving the roll-up shade web and keeping it in tension, a spring motor is provided in the interior of the wind-up shaft. For extending the roll-up shade web against the effect of the spring motor, a gear motor is provided to which crank levers are attached that are connected via rods to a short arm of each of the two-armed levers.

If the gear motor is operated in the appropriate rotational direction, the two-armed levers are moved from the rest position, in which they lie approximately parallel to the wind-up shaft, into an erected position. In this way, they tension the roll-up shade web and also carry the pull rod during the tensioning movement. For support, two holding grooves, in which the pull rod travels, is located at the top end of the rear window so that vibrations in connection with the elasticity of the two-armed levers do not permit the pull rod to contact the window.

For retracting the roll-up shade, the gear motor is set in gear. It remains in gear for a predetermined time, which is greater than the longest expected retraction time. Measures that slow the lever movement when they approach the rest position or the retracted position of the roll-up shade are not provided. The impact when the pull rod or the levers strike the housing accordingly can be hard.

It is further known to respectively use two toggle-lever arrangements, instead of the two-armed levers, each of which is hinged with its free ends on one side of the housing of the wind-up shaft and on the other side to the pull rod. The axes of these hinges and also the knee joint which connects the knee-lever arms to each other, are parallel to each other and perpendicular to the wind-up shaft. Again, no control is used to slow the movement speed of the knee-lever arrangements when the pull rod approaches the retracted end position that is defined by mechanical stops.

OBJECTS AND SUMMARY OF THE INVENTION

It is an object of the invention to provide a lever actuated roll-up shade for motor vehicles in which noises associated with the shade reaching a retracted end position are greatly reduced.

The subject rear-window roll-up shade for motor vehicles has a roll-up shade web that is preferably adapted in its outline to the form of the rear window. A rotatably mounted wind-up shaft is provided to which one edge of the roll-up shade web is fixed. The end of the roll-up shade web facing away from the roll-up shade web is connected to a pull rod. A tensioning device is used to keep the roll-up shade web in tension independent of the operating state.

In the vicinity of the side edges of the roll-up shade there are two essentially bending resistant pivot-lever arrangements, which are mounted in the wind-up shaft. The pivot axes of the pivot-lever arrangements lie perpendicular to the axis of the wind-up shaft. They are also connected to the pull rod and are used to carry and guide the pull rod at least in the movement of the pull rod from the rest position into the position corresponding to the maximum tensioned, extended position of the roll-up shade.

A stop brake device is located in the vicinity of the wind-up shaft in the movement path of the pivot-lever arrangements. The stop brake device is constructed so that it slows the movement of the pivot-lever arrangements upon movement into the rest position, which corresponds to the retracted state of the roll-up shade. In this way, hard impact noises are prevented when the pull rod reaches the limit at the end of its retracted movement.

Here, the stop brake device can also be used as a mechanical stop that defines the end position. In particular, for lever actuated roll-up shades practically no tolerance problems occur because the lever extends almost exactly horizontal in the retracted position so that maladjustments of the stop brake device lead to no positional error.

The stop brake device is in position even for an electrically driven roll-up shade to sufficiently slow down the electric drive. Special control measures to selectively slow down the drive in the vicinity of the rest position thus are eliminated.

The relationships become especially simple when only a single stop brake device is used for both pivot-lever arrangements, which acts in common for both. It is preferably arranged at the position at which the two pivot levers cross in the rest position. However, it is also possible to use a separate stop brake device for each pivot-lever arrangement when this is useful for spatial reasons, for example, because the levers do not overlap in the retracted position.

An especially simple stop brake device is achieved when an elastomer part is used for this purpose. Through appropriate shaping of the elastomer part, a progressive brake force is generated so that for increasing deformation, the required deformation force increases proportional to the path. The elastomer part can contain tubular passages lying parallel next to one another. The passages are positioned so that the axes of the through holes or passages lie perpendicular to the plane along which the pivot-lever arrangements run.

A good braking effect can be achieved when the elastomer part has two semi-cylindrical walls coaxial to each other as the stop brake device. The semi-cylindrical walls can be connected to each other by bracing walls that extend approximately in a radial direction. In such case, the outer wall in the radial direction can also be supported on the inner wall in the radial direction when the outer wall is deformed.

The stop brake device can consist of two elements that move relative to each other and that are pretensioned by means of a spring into a starting position. The elements may project one inside the other in a telescoping way, and the pretensioning device can be formed by a helical spring which reduces the space requirements. A frustum-shaped brake element, which has a through-hole through which one of the two moving elements is guided, can be used between the elements moving relative to each other. Favorable driving relationships are produced when the pretensioning device is coupled to the wind-up shaft. The pretensioning device can be formed by a spring motor.

As a pivot-lever arrangement, a continuous lever can be provided, which is mounted so that it can pivot on one end in the vicinity of the wind-up shaft about an axis running perpendicular to the wind-up shaft, with the other end being connected to the pull rod in a sliding manner. Alternatively, the pivot-lever arrangement may utilize knee-lever arrangements, with one end mounted so that it can pivot at the wind-up shaft and with the other being coupled to the pull rod. The hinge joints are axis parallel to each other and also axis parallel to the knee joint so that the two sections of the knee lever arrangement are connected to each other.

The electrical drive device can be selectively coupled to the wind-up shaft or the pivot-lever arrangement, and a gear motor can be used as the electrical drive device.

Other objects and advantages of the invention will become apparent upon reading the following detailed description and upon reference to the drawings, in which:

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

It will also be understood that the drawings are not necessarily to scale. For illustrating details, certain areas may be shown excessively large. In addition, the drawings are simplified and do not contain every detail optionally present in a practical embodiment of the invention which would be understood by a person skilled in the art. The terms "top" and "bottom" or "front" and "back" refer to the normal installation position or the terminology for motor vehicles.

DESCRIPTION OF THE PREFERRED EMBODIMENTS

Figure 1:
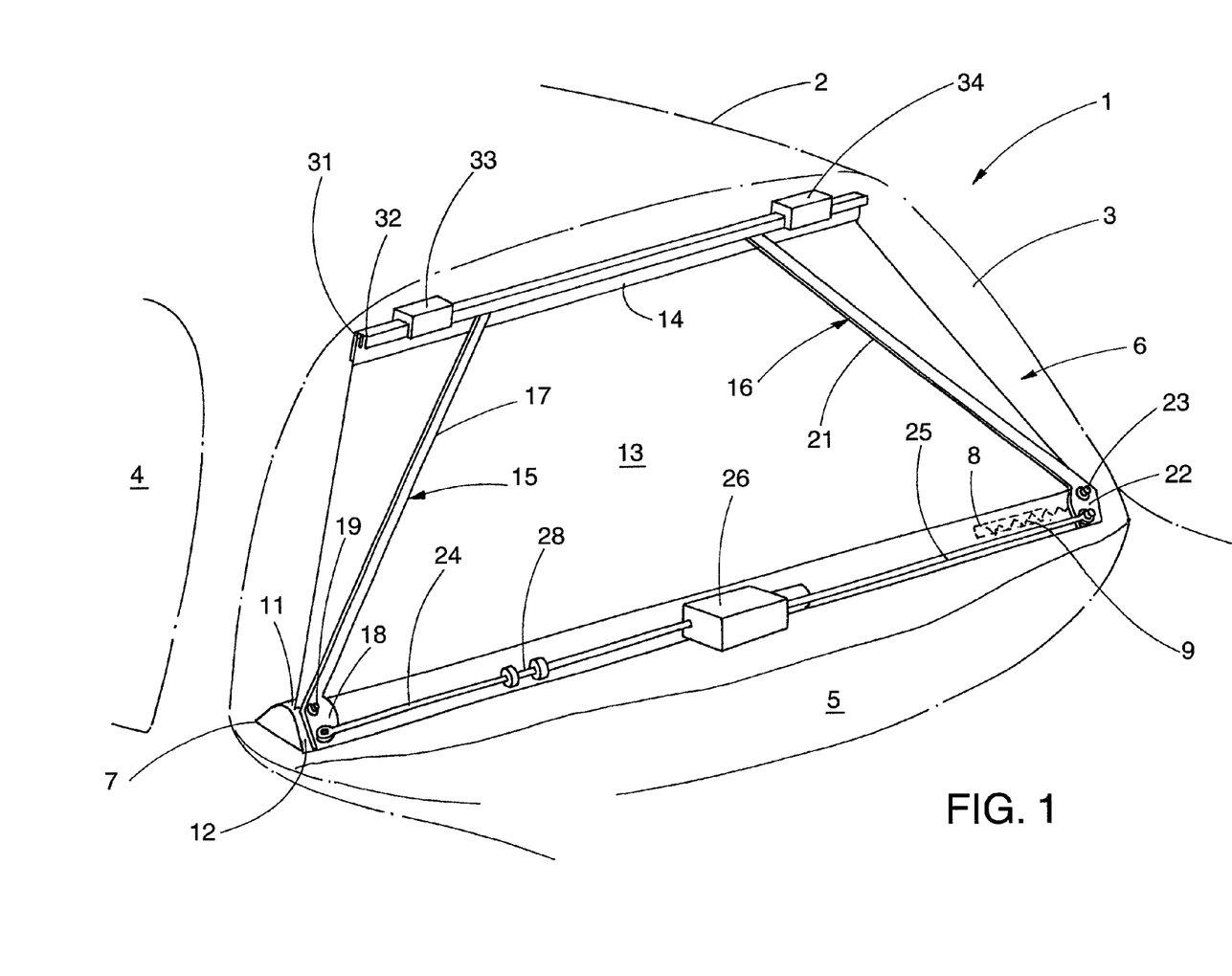
FIG. 1 is a diagrammatic depiction of the rear view perspective of a passenger car having a roller shade assembly in accordance with the invention, shown in an extended position.

Referring now more particularly to FIG. 1 of the drawings, there is shown an illustrated motor vehicle having a roll-up shade assembly 6 in accordance with the invention. As depicted from the rear in FIG. 1, the vehicle has a stepped back with a roof 2 that joins a rear window 3. The vehicle further has back side window panes 4, the left side pane of which is depicted in FIG. 1. In the interior of the vehicle in front of the rear pane 3, there is a rear seat shelf 5 which extends in a known manner to the rear side of a rear seat backrest. A rear window roll-up shade assembly 6 is disposed within the passenger compartment next to the rear pane 3.

The illustrated roll-up shade assembly 6 includes a roll-up shade housing 7 which can be arranged on or underneath the backseat shelf 5. Within the housing 7, which extends across the entire width of the back seat shelf 5 or the bottom edge of the rear pane 3, a wind-up shaft 8, depicted in dashed lines, is notably mounted. A spring motor 9, which has one end fixed to the wind-up shaft 8 and the other end connected to the housing 7, pretensions the wind-up shaft 8 in one rotational direction. The housing 7 has an outlet slot 11 on its top side next to a flat side surface 12 which extends across the entire length of the housing 7. A roll-up shade web 13, whose outline has an approximately trapezoidal shape in order to approximate the shape of the rear window 3, has one edge fixed to the wind-up shaft 8.

A pull rod 14 is fixed to an edge of the roll-up shade web 13 away from the wind-up shaft 8. For moving the pull rod 14, two pivot levers 15,16 are provided, which are mirror symmetric to each other. Both pivot levers 15,16 are two-armed, having a long arm 17 and a short arm 18. At the transition point where the long arm 17 transitions into the short arm 18, the pivot lever 15 includes a bearing borehole, through which a stationary bearing journal 19 extends that is anchored to the housing 7 on the surface 12 facing rearwardly. The journal 19 extends perpendicular to the longitudinal axis of the wind-up shaft 8 such that the long arm 17 is moveable in a plane parallel to the wind-up shaft 8.

The pivot lever 16 has a similar form and is also assembled from a long arm 21 and a short arm 22. At the transition point, there is, in turn, a bearing borehole, through which a stationary bearing journal 23 extends. The bearing journal 23 is axis parallel to the bearing journal 19. Both bearing journals 19,23 are located directly next to the ends of the housing 7.

At the free end of the two short arms 18,22, a respective pull rod or coupling rod 24,25 is connected, by means of which the two pivot levers 15,16 each are coupled to a gear motor 26. The gear motor 26, located approximately at the middle of the longitudinal length of the housing 7, carries on its output shaft two diametrically opposite cranks, not visible in the drawing, to which ends the respective pull rods 24,25 are coupled. For adjusting the positional symmetry, an adjustment device 28 is disposed along the length of the pull rod 24.

The free ends of the long arms 17,21 are connected to the pull rod 14. For this purpose, the pull rod 14 is formed with two grooves 31,32, which open toward the bottom and which lie one next to the other. In each of the grooves 31,32, one of the free ends of the long arms 17,21, respectively slides, either directly or via appropriate slide blocks.

Next to the top edge of the rear window 3 there are two holding elements 33,34, which are spaced apart from each other and which have grooves that are open toward the bottom and in which, as depicted in FIG. 1, the pull rod 14 is positioned in the extended state.

The operation of the roll-up shade 16 described thus so far is as follows:

When the roll-up shade is in the extended state, as depicted in FIG. 1, the two pivot levers 15,16 with their long arms 17,21 are erected to their maximum extent and press the pull rod 14 into the receptacle grooves of the holders 33,34. In this position, the pivot levers 15,16 are held by the gear motor 26, which exerts a traction force on the two pull rods 24,25 coupled with the motor.

When the user wishes to retract the rear-window roll-up shade 6, the gear motor 26 is operated with the reverse rotational direction by means of an appropriate switch in the motor vehicle. The pull rods 24,25, each of which is itself connected to a corresponding crank of the geared motor 26, are displaced in sync, but in the opposite direction toward the housing 7. In this way, a movement in the clockwise direction is imparted to the left pivot arm 15 and a movement in the counterclockwise direction is imparted on the right pivot arm 16. The free ends of the two long arms 17,21 move toward each other and simultaneously downwardly in a direction toward the housing 7. In this way, the spring motor 9 acts in a rotational direction for winding the roll-up shade web 13 onto the wind-up shaft 8. The roll-up shade web 13 thereby is kept in tension with the assistance of the spring motor 9 over the entire path, independent of the direction of movement.

Figure 2:
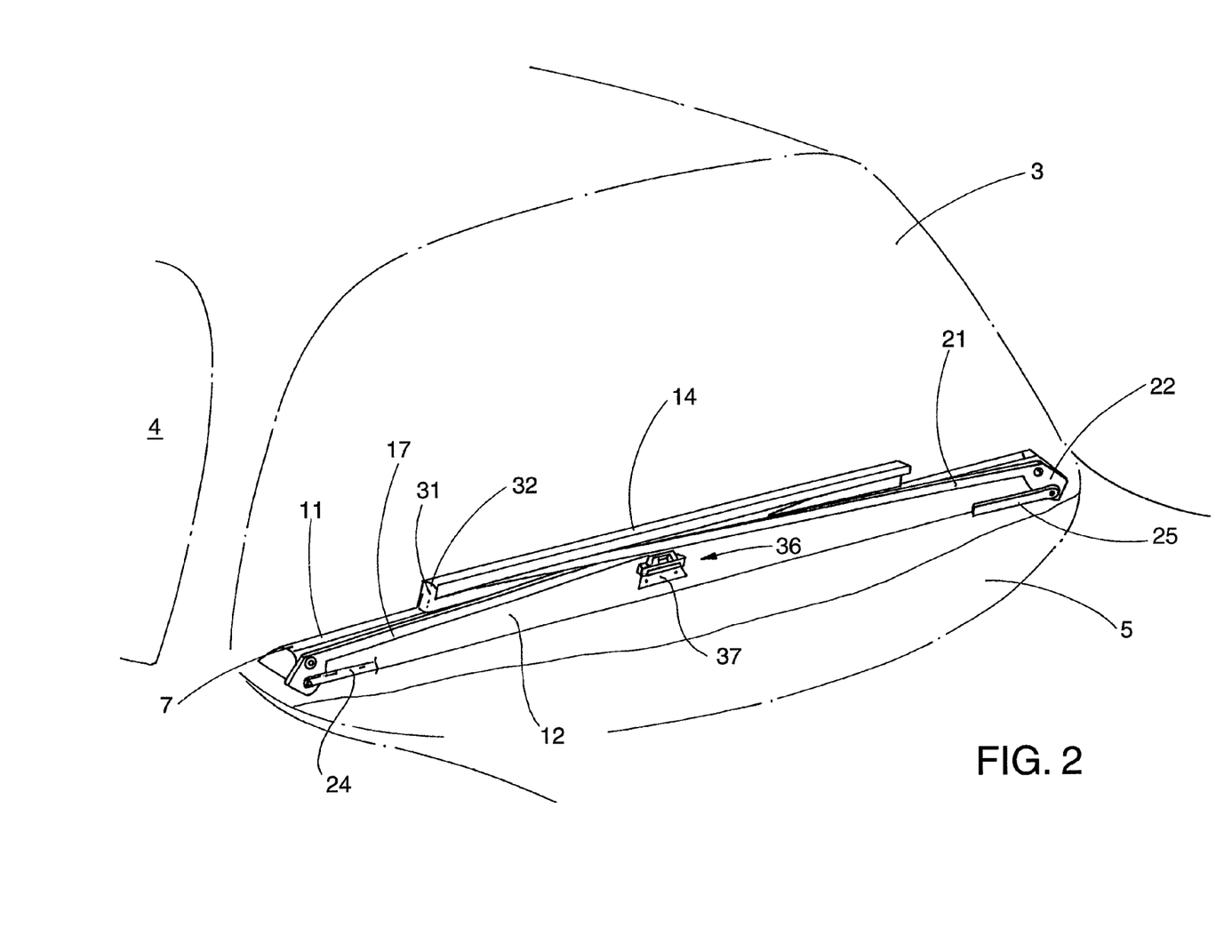
FIG. 2 is a rear view perspective, similar to FIG. 1, showing the roll-up shade assembly in a retracted position.

The free ends of the two long arms 17,21 move from the outer ends of the pull rod 14 in the direction toward the middle. According to the proportions of the rear window 3, i.e., the relative dimensions of height to width, they meet each other in a middle position of the pull rod 14 and then cross for further movement. FIG. 2 shows the retracted end position. At the end of the retraction movement, the free end of the long arm 21 is next to the left end of the pull rod 14 and the long arm 17 is next to the right end. The long arms of two pivot levers 15,16 cross approximately in the middle of the housing 7.

It will be understood that the pivot levers 15,16 are sufficiently resistant to bending in order to support the pull rod 14 together with the roll-up shade web suspended from the rod along the path of movement from the holding elements 33,34 to the outlet slot 11, or in the opposite direction. It will further be understood that the extension of the roll-up shade web 13 in the reverse direction, takes place analogously in that the pivot levers 15, 16 are erected to their upright positions with the help of the gear motor 26.

Figure 3:
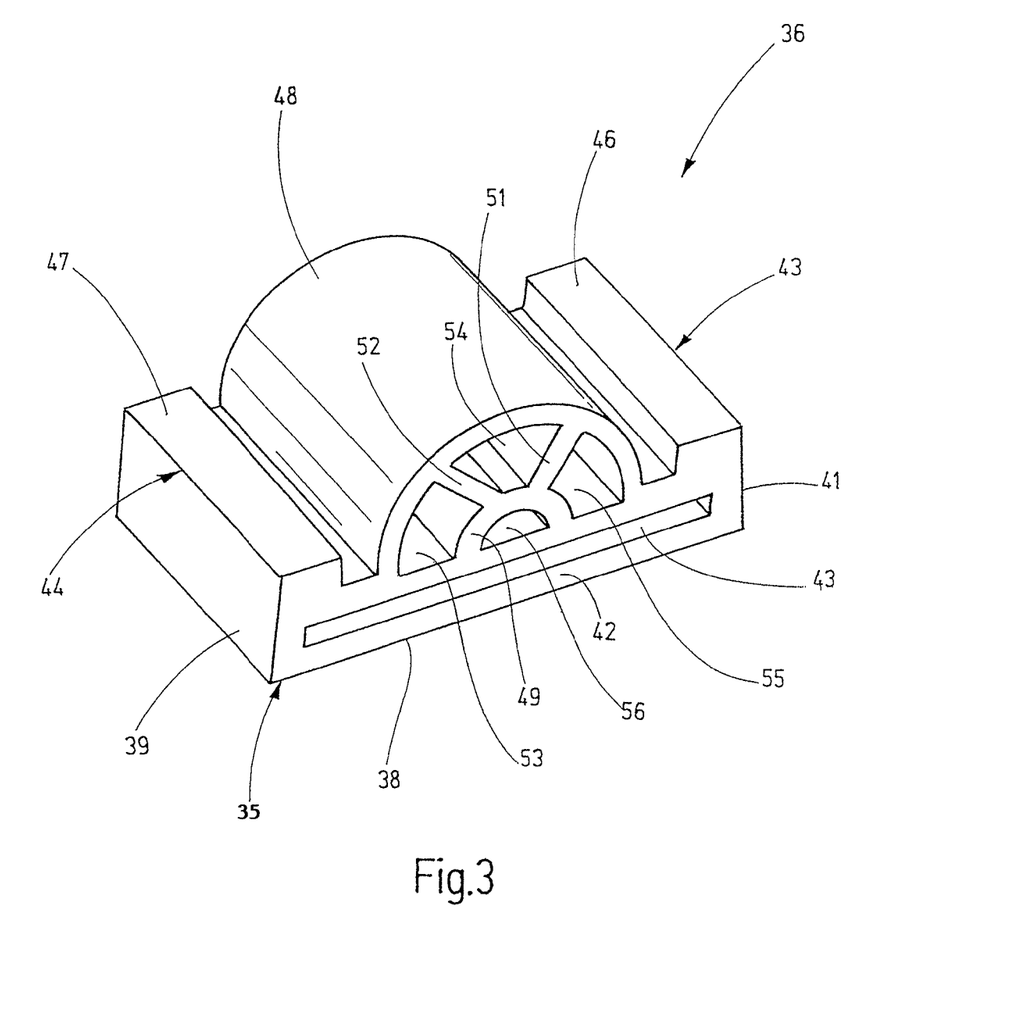
FIG. 3 is an enlarged perspective of a stop brake device for the illustrated rear window roll-up shade assembly.

To prevent a loud impact noise when the roll-up shade 6 reaches its bottom end or retracted position, there is a stop brake device 36 as depicted in FIG. 2, but which is hidden in FIG. 1 by the gear motor 26. The stop brake device 36, which is made from an elastomer part, is mounted on an angled bracket 37, as shown in FIG. 3, which is fastened to the roll-up shade housing 7, or at another appropriate position in the motor vehicle if the rear-window roll-up shade 6 is constructed without a housing 7 but instead with only a support tube or bracket. The stop brake device 36 is located at the position at which the two long arms 17,21 cross, as seen in FIG. 2 in the retracted position of the window roll-up shade 6.

The drive brake device 36 in this case is an elastomer part that is injection molded in one piece. The elastomer part 36 has an approximately rectangular base or base plate 35 defined by a bottom side 38, two short side walls 39,41 running approximately parallel to each other, and two long front and rear side walls 42 also running parallel to each other, as depicted in the figure, with only the front side being visible.

The base plate 35 includes a slot-shaped passage opening 43 with rectangular cross section extending from the long side wall 42 to the opposite side wall. The slot-shaped passage opening 43 extends, as shown, up to the vicinity of the short side walls 39,41. The slot-shaped passage opening 43 is used to permit positioning of the stop brake device 36 on a plate-shaped arm of the angled bracket 37 and to hold it in mounted position.

Two straight raised bars 43,44, which form flat contact surfaces 46,47, respectively lying parallel to each other and facing upwardly, extend parallel to the short side walls 39,41 on the top side of the base plate 35. Toward the inside, the two bars 43,44 are bound by a groove, within which a semi-cylindrical, curved wall 48 rises over the bars 43,44. The open side of the semi-cylindrical wall faces toward the base plate 35. The semi-cylindrical wall 48 is arranged in the middle between the two bars 46,47 and its longitudinal axis is perpendicular to the surfaces of the long side surfaces 42 of the base plate 37.

A radially inner semi-cylindrical wall 49 extends concentric to the outer semi-cylindrical wall 48. Hence, its axis coincides with the axis of the outer semi-cylindrical wall 48. Both semi-cylindrical walls 48,49 extend over the entire width of the base plate 37.

Two flat walls 51,52 connect the inner semi-cylindrical wall 49 with the outer semi-cylindrical wall 48. The two walls 51,52 lie approximately on radii that project from the axis of the two semi-cylindrical walls 48,49. Together they enclose an angle of about 60°. Alternatively, the two flat walls 51,52 could project upwardly from the vortex line of the inner semi-cylindrical wall 49. In this way, in each case there is a total of four continuous channels 53,54,55,56. The channel 56 has a semi-circular cross section. The two channels 53,54, 56 have a cross section corresponding to a sector of a circular ring. The channel 54 may have a cross section corresponding to a sector of a circular ring or a sector of a circle. None of the channels 53-56 change their cross section along their length and the channels 53-56 are open in both directions.

The elastomer body which forms the stop brake device 36 is placed on the angled bracket 37, as depicted in FIG. 2. The outer side of the semi-cylindrical wall 48 faces upwardly in the direction toward the long arms 17,21 of the two pivot levers 15, 16. The longitudinal axis of the semi-cylindrical wall 48 lies parallel to the axes of the bearing journals 19,23 and thus perpendicular to the longitudinal axis of the wind-up shaft 8. The axes of the channels 53-56 lie parallel to the bearing journals 19,23.

By use of the stop brake device, it is possible to achieve a desired slowdown in the movement of the two pivot levers 15,16, when they approach the retracted end position. In particular, it is possible with the shape of the stop brake device to generate a progressive braking force. This slowdown takes place without special control in the power to the motor during the retraction movement.

More particularly, the deformation takes place somewhat as follows. The two long arms 17,21 contact, each for itself, points spaced apart from each other on the outer side of the semi-cylindrical wall 48. The points are spaced apart from each other both in the axial direction and also in the circumferential direction of the semi-cylindrical wall 48. They lie approximately at points at which the two straight support or separating walls 51,52 extend inwardly from the outer semi-cylindrical wall 48.

During the movement, the semi-cylindrical wall 48 experiences increasing deformation, which leads to deformation of the separating walls 51,52, and finally the semi-cylindrical wall 49 is also deformed. During the movement, obviously increasingly more areas of the stop brake device are deformed, by means of which the necessary deformation force increases progressively, which slows down the motor accordingly because additional power is required from it. At the end of the movement, the long arms 17,21 finally meet the still slightly deformable top sides 46,47 of the two bars 43,44, by means of which the end position for the two pivot levers 15,16 is achieved. Due to the decreasing movement speed, there is no audible noise when the end position corresponding to the retracted position is reached.

In the embodiment according to FIG. 2, a single stop brake device 36 is used for both pivot levers 15,16. It will be understood, however, that two separate stop brake devices 36 alternatively could be used, in which each would interact with a respective pivot lever 15,16.

The stop brake device 36 according to the invention is not limited in its use to rear-window roll-up shades 6 using rigid pivot levers. Alternatively, it can also be used for rear-window roll-up shades 6 using two knee-lever arrangements 60,61, as depicted in FIG. 4.

Each knee-lever arrangement 60,61 is assembled from a top and a bottom knee-lever arm 62,63, respectively, which are connected to each other by a hinge-like knee joint 64. The lower knee lever arm 63 is constructed similar to the pivot arm 15, but with the difference that the long arm is significantly shortened. The upper knee-lever arm 62 leads from the knee joint 64 to the pull rod 14 wherein it is connected by a hinge 65 adjacent of the outer end of a pull rod 14. The axis of the hinge-like knee joint 64 lies parallel to the pivot axis formed by the bearing bolts 19, and also parallel to the pivot axis of the hinge 65. The knee-lever arrangement 60 is similarly constructed and further explanation is unnecessary. The parts present there are labeled with the same reference symbols with an added apostrophe.

Figure 4:
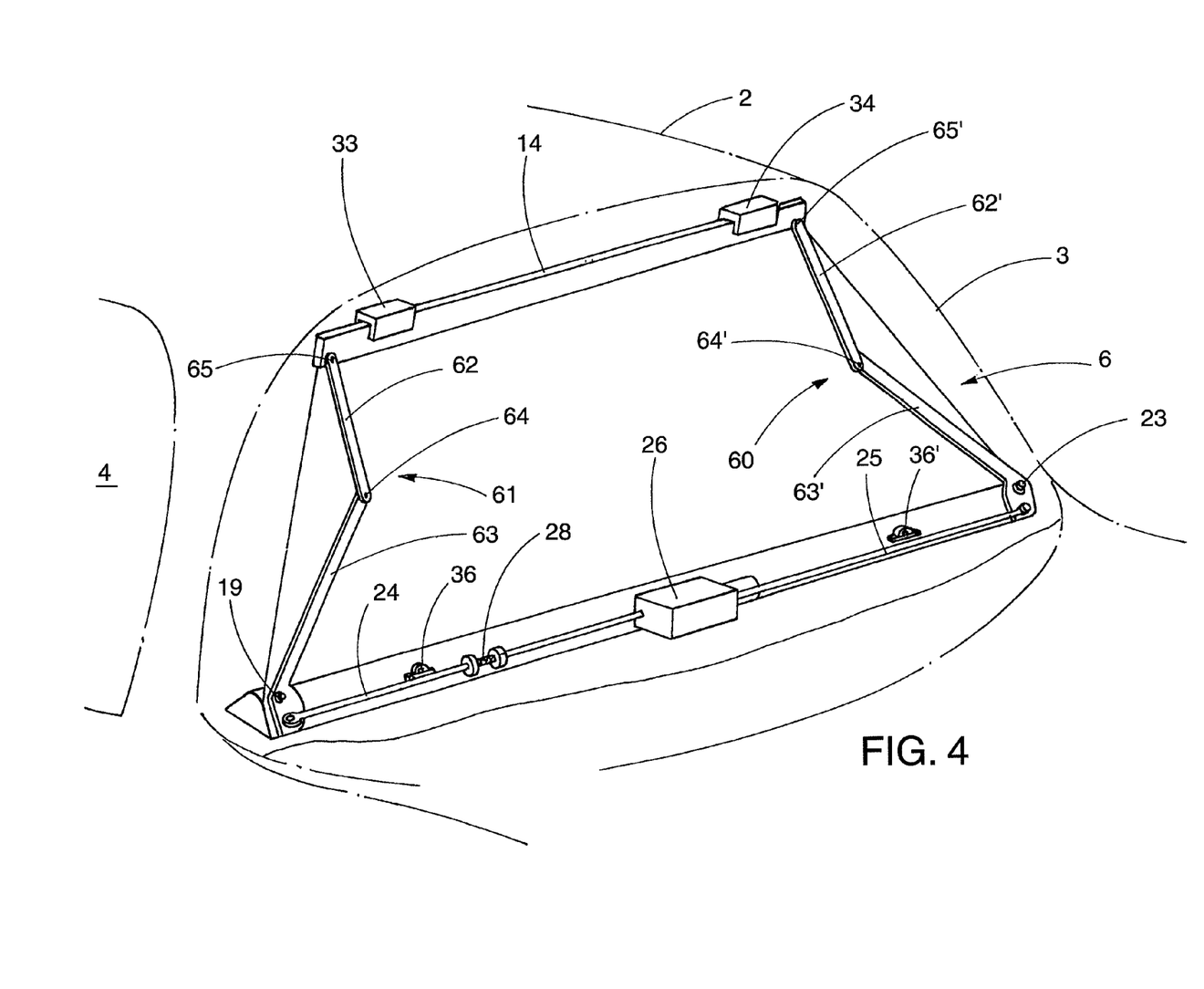
FIG. 4 is a rear view perspective, similar to FIG. 1, showing an alternative embodiment of rear window roll-up shade assembly which utilizes knee-lever arrangements.

In the embodiment according to FIG. 4, because the two knee-lever arrangements 60,61 overlap at no point even in the retracted state, for each lower knee-lever arm 63 there is a separate stop brake device 36 or 36'. They are located at the point on the side wall 12 facing upwardly, which point lies in the vicinity of the idle knee joints 64 or 64' when the knee-lever arrangements 60,61 are folded up. The foregoing stop brake devices are very economical in construction since they are in the form of the one-piece injection-molded elastomer part.

Figure 5:
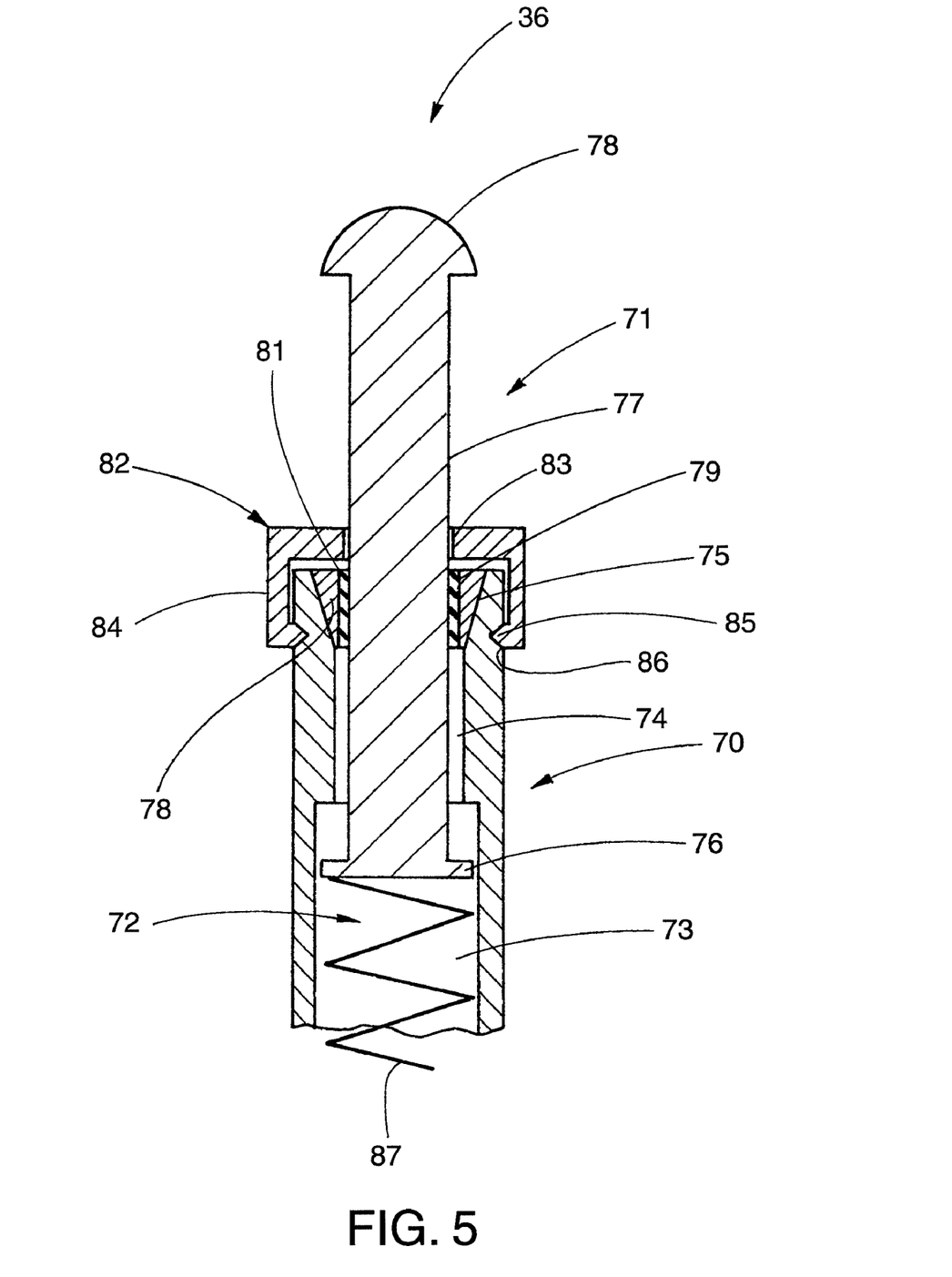
FIG. 5 is an enlarged longitudinal section of an alternative embodiment of stop brake device that includes a pair of telescopically movable brake elements.

Alternatively, a stop brake device as shown in section in FIG. 5 could also be used. The stop brake device 36 in this case is made from two relatively moveable main elements in the form of an outer tube 70 and a rod 71 that can move in the tube. The tube 70, which is shown cut away in FIG. 5, if formed with a stepped borehole 72 having a lower section 73, a middle section 74, and an upper conical section 75. The sections 73,74 are cylindrical, wherein the section 74 has a smaller diameter than the section 73.

The rod 71 which is moveable in the outer tube 70, has a plate 76 with a diameter corresponding to that of the section 73. A smooth cylindrical shaft 77 extending from the plate 76 transitions through a tubular conical head 78. The tubular cone piece 78 is slotted on one side and formed with a cylindrical passage borehole 79 projecting through the conical section 75. Within the passage borehole 79 there is a tubular elastomer bushing part 81 with a suitable opposite friction coefficient for the cylindrical shaft 77.

On the upper end of the outer tube 70 there is a cap 82 having an axial bore 83 for the passage of the shaft 77. A collar 84 of the cap 82 covers the outer end of the tube 70 and is formed with a hook-shaped annular edge 85, which extends inwardly for locking engagement with a corresponding peripheral groove 86 in the outer tube 70.

A biasing spring 87, which is arranged within the section 73 and which is supported in the other end on the closed base of the outer tube 70, biasing the moving part 71 into the displaced or extended position, in which the plate 76 contacts the shoulder between the section 73,74. When the lever arrangement is pressed against the head 78 with its retracting force, the rod 71 is pushed back into the outer tube 70. In this way a brake force is generated between the elastomers of the tubular section 81 and the smooth cylindrical shaft 77. Because the outer conical sleeve 78 is slotted and pretensioned inwardly in a radial direction, in each case a base friction force is generated between the friction coating 81 and the shaft 77. Due to the conical surface in the conical borehole, the pretensioning force of the conical sleeve 78 is reinforced when the friction between the elastomer coating 81 and the shaft 77 is active during the inward movement of the rod 71. Suitable selection of the cone angle of the conical section 75 prevents the production of a self-locking or self-blocking effect.

If natural rubber is used as the elastomer lining, this exhibits, as a function of the relative movement, a rising friction coefficient, so that with a smaller relative movement, that is, a smaller force acting from the outside, a smaller braking effect is generated compared with a large force that tends to slide the rod quickly. The illustrated arrangement can be used at appropriated positions relative to the lever arrangement, in lieu of the stop brake device constructed as a monoblock illustrated in FIGS. 1 to 4. Instead of the arrangement according to FIG. 5, a toothed rack arrangement could also be used in connection with a silicon brake driven by means of a gear wheel, as they are typically used.

From the foregoing, it can been seen that a lever actuated roll-up shade for motor vehicles is provided with a novel stop brake device. The stop brake device is effective for slowing down the movement of the lever during retraction in the vicinity of the end positions so that loud impact noises are prevented.

The invention claimed is:

1. A rear-window roll-up shade for motor vehicles, comprising
 a wind-up shaft mounted for rotational movement,
 a roll-up shade web having one edge fixed to the wind-up shaft (8) and opposite edge fixed to a pull rod for movement relative to the wind-up shaft between extended and retracted positions,
 a tensioning device for maintaining the roll-up shade web in tension when in an extended position,
 two pivot-lever arrangements connected to the pull-rod having pivot axes perpendicular to the rotational axes of said wind-up shaft for moving the pull rod and the window shade web affixed thereto between said extended and retracted positions,
 at least one deformable elastomer stop brake device mounted in the movement path of the pivot-lever arrangements for progressively braking and slowing down movement of the pivot-lever arrangements upon engagement with the elastomer stop brake device during the movement of the pull rod into a rest position corresponding to the retracted position of the roll-up shade web, and
 a selectively operable electrical drive device for moving the roll-up shade web at least in one of its movement directions.

2. The rear-window roll-up shade of claim 1 in which said pivot-lever arrangements comprise levers that are resistant to bending.

3. The rear-window roll-up shade of claim 1 in which a single stop brake device (36) is engageable by both pivot-lever arrangements (15, 16; 60, 61) for simultaneously slowing movement of both pivot-lever arrangements.

4. The rear-window roll-up shade of claim 1 including a pair of separate stop brake devices (36) each of which is engageable and slows down a respective one of the pivot-lever arrangements during movement to a retracted position.

5. The rear-window roll-up shade of claim 1 in which said at least one stop brake (36) is an elastomer part.

6. The rear-window roll-up shade of claim 5 in which said elastomer part (36) is a single piece.

7. The rear-window roll-up shade of claim 5 in which said elastomer part (36) has two concentric curved walls (48,49) which are spaced apart from each other.

8. The rear-window roll-up shade of claim 7 in which said curved walls have a semi-cylindrical configuration.

9. The rear-window roll-up shade of claim 8 in which said semi-cylindrical configured walls (48,49) are connected to each other by walls (51,52) that extend in an approximate radial direction.

10. The rear-window roll-up shade of claim 5 in which said elastomer part (36) is formed with a plurality of passage channels (53,56) extending parallel to each other.

11. The rear-window roll-up shade of claim 1 in which stop brake device (36) includes two relatively moveable elements (70,71), and a pre-tensioning device (87) for biasing one of the elements into a start position.

12. The rear-window roll-up shade of claim 11 in which said two elements (70,71) extend one in the other in telescoping fashion.

13. The rear-window roll-up shade of claim 11 in which said tensioning device (87) is a helical spring housed within the stop brake device (36).

14. The rear-window roll-up shade of claim 1 in which said tensioning device (9) is a spring motor coupled to the wind-up shaft.

15. The rear-window roll-up shade of claim 1 in which each said pivot-lever arrangement (15, 16; 60, 61) is a rigid lever mounted at one end adjacent an wind-up shaft (8) for pivotal movement about an axis (19, 23) perpendicular to the wind-up shaft and whose other end is connected to the pull rod (14) for relative sliding movement.

16. The rear-window roll-up shade of claim 1 in which each pivot lever arrangement (15, 16; 60, 61) is a knee-lever mounted at one end to wind-up shaft (8) for rotation about an axis (19, 23) perpendicular to the wind-up shaft (8) and which has an opposite end connected to the pull rod (14) by a hinged joint (65) having a hinge axis parallel to the rotational axis of the knee lever such that the knee lever (60,61) is pivotably movable relative to the wind-up shaft (8).

17. The rear-window roll-up shade of claim 1 in which said electrical drive device (26) is coupled to one of said wind-up shaft (8) or pivot-lever arrangement (15, 16; 60, 61).

18. A rear-window roll-up shade for motor vehicles, comprising
a wind-up shaft mounted for rotational movement,
a roll-up shade web having one edge fixed to the wind-up shaft and opposite edge fixed to a pull rod for movement relative to the wind-up shaft between extended and retracted positions,
a selectively operable electrical drive device for moving the roll-up shade web to the extended position,
a spring tensioning device for maintaining the roll-up shade in tension when in an extended position and for returning the roll-up shade to the retracted position,
two pivot-lever arrangements connected to the pull-rod having pivot axes perpendicular to the rotational axes of said wind-up shaft for moving the pull rod and the window shade web affixed thereto between said extended and retracted positions, and
at least one deformable elastomer stop brake device mounted in the movement path of the pivot-lever arrangements for progressively braking and slowing down movement of the pivot-lever arrangements upon engagement with the elastomer stop brake device during the movement of the pull rod into a rest position corresponding to the retracted position of the roll-up shade web.

19. The rear-window roll-up shade of claim 18 in which said at least one stop brake (36) is an elastomer part formed with a plurality of passage channels (53,56) for facilitating deformation of the stop brake.

20. The rear-window roll-up shade of claim 19 in which said elastomer part (36) is a single piece having two concentric semi-cylindrical configured curved walls disposed in spaced apart relation from each other.

* * * * *

UNITED STATES PATENT AND TRADEMARK OFFICE
Certificate

Patent No. 8,167,021 B2                                                              Patented: May 1, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Olaf Bühl, Albershausen (DE); and Harry Weinbrenner, Oberboihingen (DE).

Signed and Sealed this Fifth Day of February 2013.

KATHERINE W. MITCHELL
*Supervisory Patent Examiner*
Art Unit 3634
Technology Center 3600